United States Patent
Hipp et al.

(10) Patent No.: US 7,197,516 B1
(45) Date of Patent: Mar. 27, 2007

(54) METHOD AND SYSTEM FOR AN OVERLAY FILESYSTEM

(75) Inventors: Burton Akira Hipp, Mountain View, CA (US); Carlos Wong, Mountain View, CA (US); Yuh-Yen Yeh, Mountain View, CA (US)

(73) Assignee: VERITAS Operating Corporation, Cupertino, CA (US)

(*) Notice: Subject to any disclaimer, the term of this patent is extended or adjusted under 35 U.S.C. 154(b) by 448 days.

(21) Appl. No.: 10/625,219

(22) Filed: Jul. 22, 2003

Related U.S. Application Data

(60) Provisional application No. 60/397,500, filed on Jul. 22, 2002.

(51) Int. Cl.
  *G06F 17/30* (2006.01)
(52) U.S. Cl. ........................................ 707/200
(58) Field of Classification Search .......... 707/1–10, 707/100–104.1, 200–206; 709/203; 717/178
  See application file for complete search history.

(56) References Cited

U.S. PATENT DOCUMENTS

| | | | |
|---|---|---|---|
| 5,313,646 A | | 5/1994 | Hendricks et al. |
| 5,367,698 A | * | 11/1994 | Webber et al. ............... 709/203 |
| 5,611,049 A | | 3/1997 | Pitts |
| 5,689,706 A | * | 11/1997 | Rao et al. .................... 707/201 |
| 5,832,515 A | | 11/1998 | Ledain et al. |
| 6,025,844 A | | 2/2000 | Parsons |
| 6,321,219 B1 | | 11/2001 | Gainer et al. |
| 6,374,268 B1 | * | 4/2002 | Testardi ....................... 707/205 |
| 6,766,371 B1 | | 7/2004 | Hipp et al. |
| 6,823,336 B1 | | 11/2004 | Srinivasan et al. |
| 6,918,113 B2 | * | 7/2005 | Patel et al. .................. 717/178 |
| 2003/0177107 A1 | * | 9/2003 | Brown et al. .................. 707/1 |

* cited by examiner

*Primary Examiner*—Diane Mizrahi
(74) *Attorney, Agent, or Firm*—Meyertons Hood Kivlin Kowert & Goetzel, P.C.; B. Noël Kivlin

(57) ABSTRACT

An overlay filesystem is described. The overlay filesystem is capable of accessing files from a first layer or a second layer based on one or more criteria. The overlay filesystem is also capable of saving changes made to any files in a different layer while preserving the original files in the original layer.

19 Claims, 11 Drawing Sheets

METHOD AND SYSTEM FOR AN OVERLAY FILESYSTEM

CROSS-REFERENCE TO RELATED APPLICATIONS

This application claims the benefit of Provisional Patent Application Ser. No. 60/397,500, filed Jul. 22, 2002, entitled "Overlay Filesystem", which is incorporated by reference.

BACKGROUND OF THE INVENTION

1. Field of the Invention

The present invention relates generally to computer filesystems. More particularly, the present invention relates to a method and system for an overlay filesystem.

2. Description of Related Art

The application processing network (APN) is a shared hosting infrastructure, which requires that applications are packaged into modular units capable of sharing machine resources without conflict. It also requires that the application's configuration is 'portable' and can easily be moved from machine to machine as it executes, without pre-configuration or global replication. Thus a mechanism is required that isolates any modifications to files into a single private directory hierarchy that is instantly accessible from all machines on an APN.

This need has been partially met using a technique that employs dynamic symbolic links. This technique in effect allows modifications of specific files and directories to be retargeted to a private directory hierarchy. The primary disadvantage of this technique is that an application must be analyzed, pre-configured, and these changes must be replicated to all compute nodes. As new sites are added to the APN, their addition will impact running sites since these changes must be made to "live" compute nodes. The rule should be very simple: site-specific changes should only go in site-specific directories. This approach keeps applications isolated from one another and preserves the integrity of the original compute node software and layout. An alternative to this approach is to modify the application configuration so that changes to OS-specific files and directories are not made. Unfortunately, this alternative requires more overhead when capturing sites, and all changes cannot be isolated without some additional technology, i.e. /etc/passwd entries. The current mechanism must be improved upon to streamline the onboarding of applications onto the APN, and to avoid a maintenance nightmare with numerous (and potentially conflicting) system file changes.

What is needed is a filesystem which has a shared read-only back filesystem, has front filesystems at a process level or process group level, is transparent to the application, preserves filesystem semantics, requires minimal performance overhead, and has a portable design.

SUMMARY OF THE INVENTION

A method for manipulating a file in a filesystem, where the filesystem has at least a first layer and a second layer, includes retrieving the file from the first layer if the file is in the first layer, and if the file is subsequently changed, saving the file in the first layer. If the file is not in the first layer, then the file is retrieved from the second layer, and if the file is subsequently changed, the changed file is saved in the first layer. If the file is not in the first layer or the second layer, then the file is created and saved in the first layer.

DETAILED DESCRIPTION OF THE INVENTION

Figure 1:
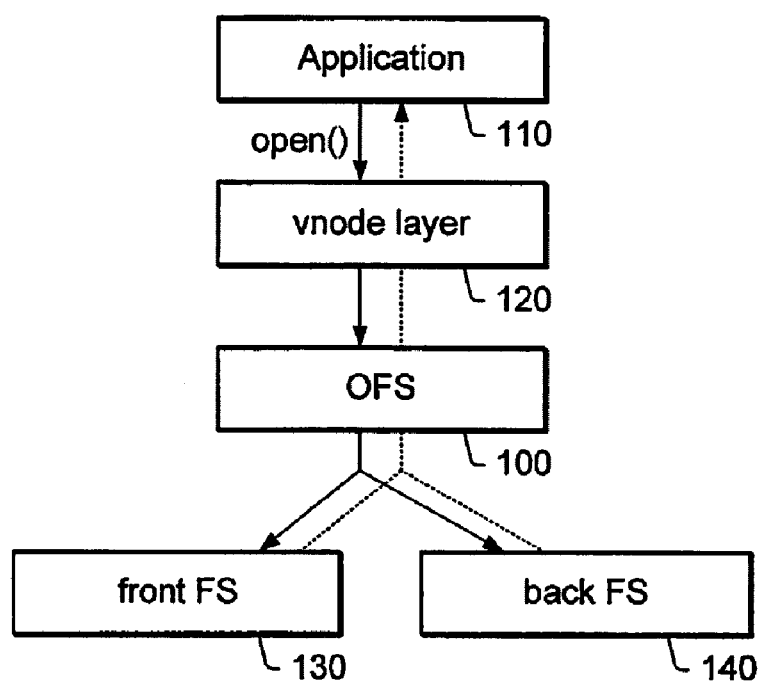
FIG. 1 shows a system with an OFS.

The overlay filesystem (OFS) of the present invention provides multiple transparent layers of directories and files. This feature enables versioning of files/directories and sharing with copy-on-write semantics. An OFS view is constructed by successively mounting a number of directories (layers) on top of each other and presenting the composite view of all layers as seen from above. Whenever one or more layers has a file with the exact same pathname, the file that is represented is that residing in the topmost layer. By layering directories, OFS can provide (1) filesystem versioning, (2) enable customized views of the same directory location by using the same back filesystem with a different front filesystem, and (3) sharing read-only public directories with copy-on-write privileges.

OFS is a filesystem module that resides in the kernel, typically a UNIX operating system, and is plugged into the virtual filesystem switch (VFS). OFS intercepts I/O requests and routes such requests to the appropriate underlying filesystem (front, back, or n-th layer), presenting the topmost layer. Any requests that modify the filesystem (i.e. write( ), chmod( ), etc.) are redirected to the top layer regardless of whether there is an underlying representation of the same file/directory.

An OFS filesystem is presented when one directory is OFS-mounted on top of another. At this point, an OFS view is provided to the process initiating the mount. From this point forward, any new child processes forked from the process initiating the mount will bequeath the OFS view to its siblings.

OFS mounts of directories have transparent properties that allow an underlying directory hierarchy to be visible with another directory mounted on top of it. Modifications to a file or directory that exists exclusively in a lower layer will force a copy-on-write fault of the data written to the top layer. Any layer below the top is maintained as read-only with apparent write semantics. As directories are overlaid via OFS, the directory contents are presented as the union of the overlapping directories. If more than one layer has the same entry in the same directory, the topmost version is the only version that is presented. OFS views are applied per-process or process group (via inheritance), so different processes may each have custom views of the same directory. This application of views is achieved by using the same underlying directory with different directories that are OFS-mounted. By adding a chroot( ) command after the construction of the OFS view, the process may have a custom system view as well. OFS abstracts the representation of the underlying filesystem nodes by creating an onode structure that represents a specific point (filesystem entry) in the OFS overlay. That specific point may have many underlying nodes in different layers, but the representation of that point is presented back to the kernel with a generic node representation. OFS is a pseudo-filesystem and does not use a proprietary filesystem structure since it is not block-based (no superblock, partition table, FS header, etc.). Files in the back filesystem are simply files within a directory hierarchy. Files in the front filesystem are also the same, with the exception of copy-on-write files.

The OFS module is initialized as part of the boot sequence. A directory hierarchy for the back filesystem should already exist. A directory hierarchy for the front filesystem may exist or may be an empty directory. The front directory is OFS-mounted on the back directory. An association between the OFS mount and the process is constructed. Optionally, a chroot( ) may be issued to the mount point to provide a "complete" OFS view to the application. Optionally, additional processes may be forked, inheriting the same OFS view. As filesystem lookups are performed, OFS creates OFS file handles that contain pointers to all representations (in all layers) of the file or directory that is being looked up. As filesystem requests are issued, OFS redirects "write" operations to the front filesystem, faulting if necessary. Read operations are directed to the topmost layer.

Copy-on-write files are stored in a proprietary format (still a flat file), that describes which copy-on-write pages are represented from this layer. A file of this type contains a header with series of alternating page bitmaps and data pages. This file has sparse regions where data pages are not populated. Files that have not been copy-on-write faulted are represented normally.

The OFS of the present invention is a loadable module that superimposes multiple directories into a single virtual view for a running application. The intent is to isolate directory modifications to a specific directory sub-tree, and to provide per-application views of a directory structure.

Filesystem isolation allows applications to make apparent modifications to a shared filesystem hierarchy without actually changing the shared file. This is accomplished through a mechanism of copy-on-write, which allows for maximum sharing, but makes private copies of modified files, which are strictly local to the running application.

This result is accomplished by implementing a two-tiered layer of filesystems, where the bottom layer is the shared read-only layer and the top layer is the private writable layer. The top layer has transparent properties, so that if a file exists in the bottom layer, but is not present in the top layer, the file on the bottom layer can be "seen" through the top layer. However, if the same file exists in both layers, the top layer blocks the bottom layer and the file on top is presented.

An OFS is a copy-on-write implementation of a filesystem, consisting of two layers where modifications to files are kept in the top layer and a read-only representation of the files is visible on the bottom layer. A filesystem refers to a directory hierarchy that is mounted on another directory (i.e. NFS), and does not necessarily mean a traditional mountable filesystem (i.e. local disk partition). A front filesystem refers to the top layer of an overlay filesystem. The front filesystem is the filesystem that contains private, local copies of files. A back filesystem refers to the bottom layer of an overlay filesystem. The back filesystem is the filesystem that is shared and read-only. In the context of an APN, the back filesystem will typically be the root directory "/".

FIG. 1 shows a system with an OFS 100. An application 110 sends a filesystem operation to a vnode layer 120. Vnode layer 120 then passes the filesystem operation to OFS 100, which then selectively routes the filesystem operation to a front filesystem 130 and/or a back filesystem 140.

OFS 100 is implemented via a kernel module that is a loadable filesystem. The Solaris® operating system supports multiple filesystem types via a filesystem switch that allows different filesystems to be plugged into the I/O routines by a mount( ) system call. Once the mount has been performed, file handles are set up using vnodes (a generic representation of the file handle) with a pointer to the filesystem-specific handlers (vnodeops).

Using this mechanism, OFS handlers are installed to intercept open, read, write, and other filesystem operations. Once the OFS handler is invoked, logic may be applied to determine whether the file request should be satisfied from front filesystem 130 or back filesystem 140.

Figure 2:
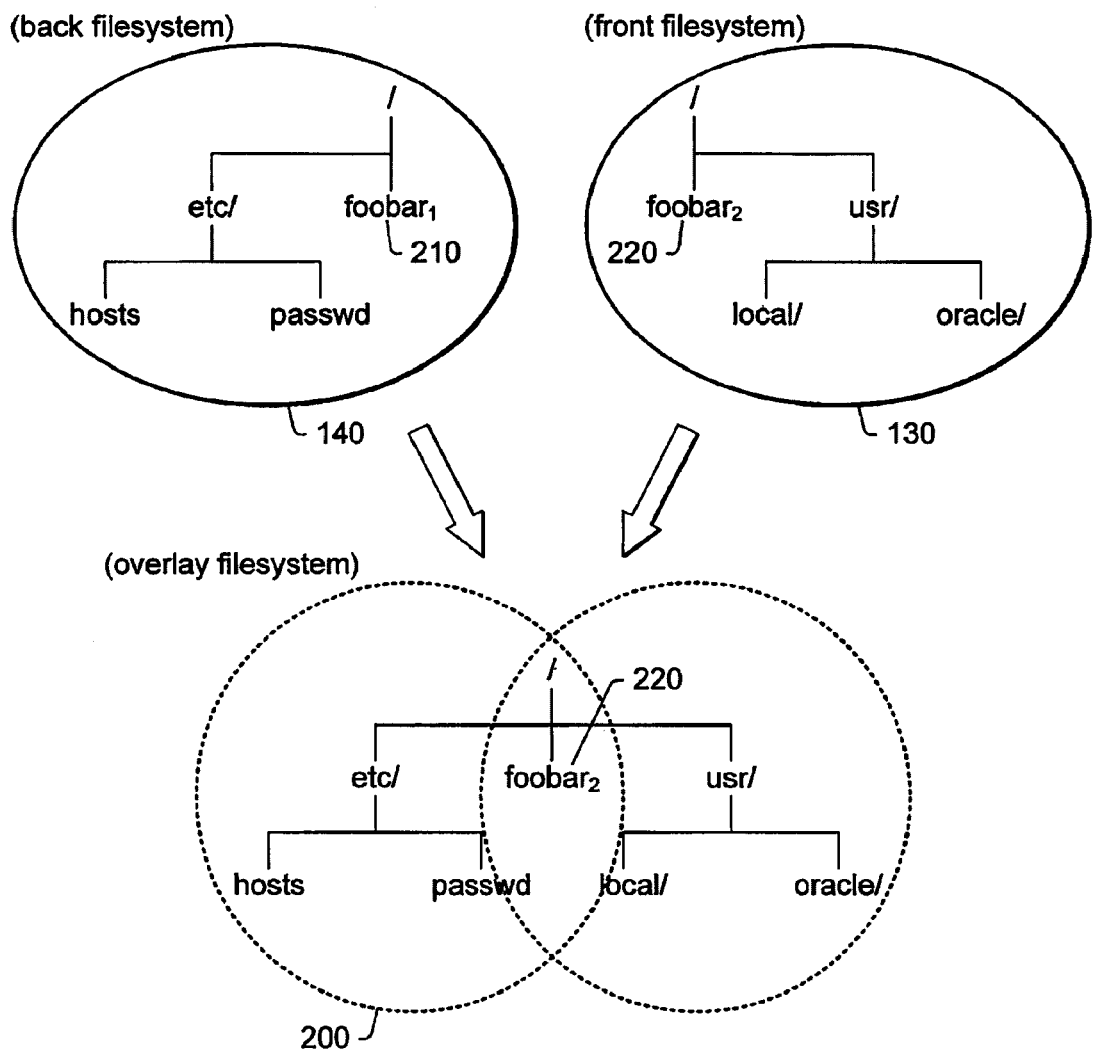
FIG. 2 shows an example of an overlay filesystem composed from a front filesystem and a back filesystem.

FIG. 2 shows an example of an overlay filesystem 200 composed from a front filesystem 130 and a back filesystem 140. OFS 100 provides a logical view of a directory hierarchy that is actually composed of two directories. This view is accomplished by mounting one directory on top of another, intercepting file I/O requests in OFS 100, and then selectively routing requests to a top directory, associated with front filesystem 130, or a covered directory, associated with back filesystem 140. Allowing either directory to satisfy a file request provides an overlay effect, combining the contents of both directory hierarchies. The application is presented a composite view of these two directories with entries in front filesystem 130 taking precedence over entries with the same name in back filesystem 140. This view is specific to the process issuing the mount request (and child processes which also inherit this view). Note how the contents of the directories are combined, but a back version of a file 210 and a front version of the file 220 at the same location in both directories is represented by the front version of the file 220 in the composite view.

Figure 3:
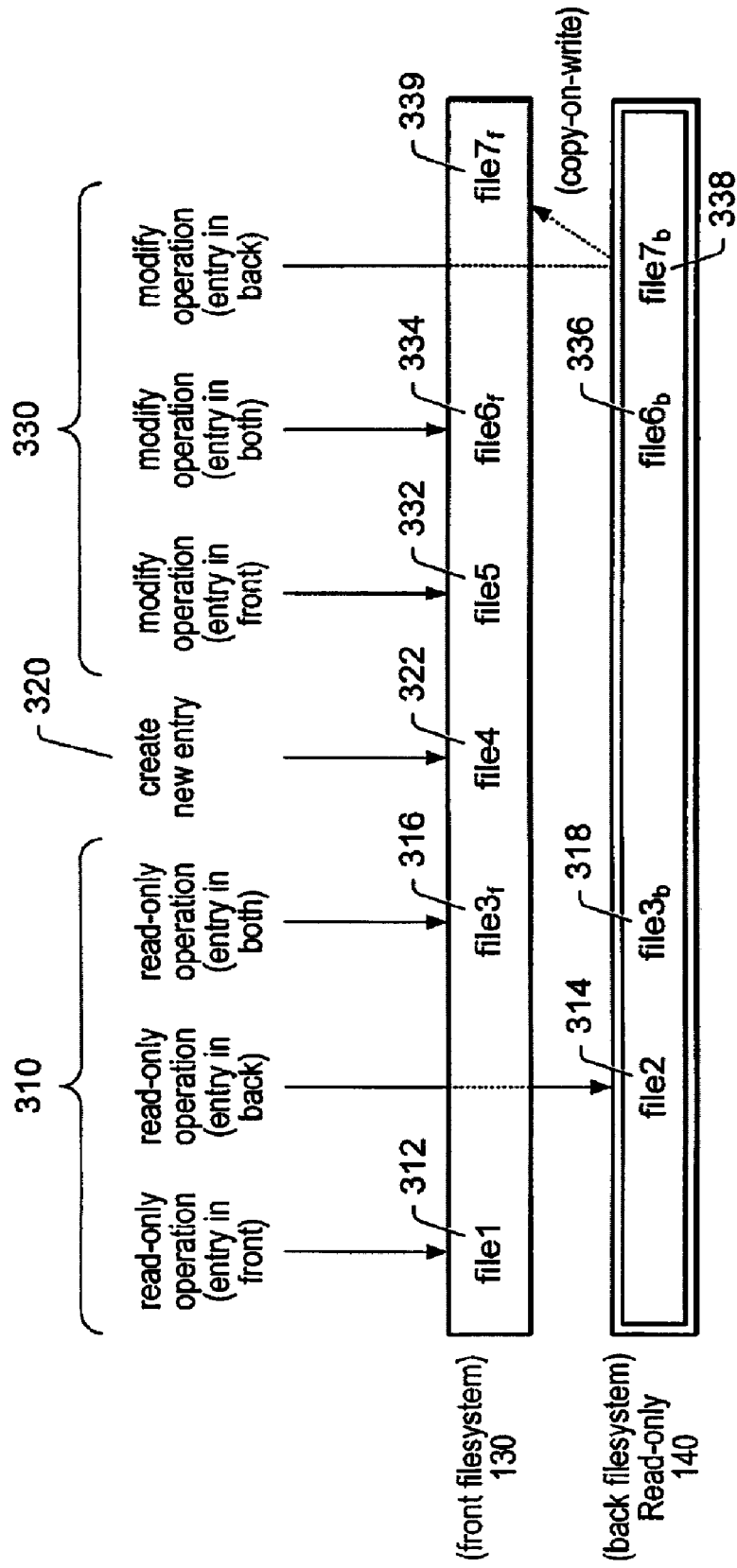
FIG. 3 shows how various filesystem operations are resolved in an OFS.

FIG. 3 shows how various filesystem operations are resolved in OFS 100. The general rule for all file operations and directory operations is that modifications can only be made to front filesystem 130. Read-only operations may "pass" through front filesystem 130 if there is not an object on top blocking it. Read-only operations are system-calls such as read( ) and stat( ) while modify operations are system-calls like write( ) or chown( ).

Operations are satisfied from front filesystem 130, except in the case of a modify operation when there is no entry in front filesystem 130. In this case, the entry is faulted from the back to front (copy-on-write) and the entry in front filesystem 130 is modified. The layering of the front filesystem 130 and back filesystem 140 is stateless (like NFS).

The views presented by OFS 100 are constructed at run-time and there is no external filesystem structure or meta-state saved to disk.

A read-only operation 310 reads from front layer 130 when there is an entry 312 (a file having a specified path associated with the operation) in front layer 130 and no entry in back layer 140. Read-only operation 310 reads from back layer 140 when there is no entry in front layer 130 and an entry 314 in back layer 140. Read-only operation 310 reads from front layer 130 when there is an entry 316 in front layer 130 and an entry 318 in back layer 140. A create new entry operation 320 creates a new entry 322 in front layer 130. A modify operation 330 modifies a file 332 in front layer 130 when there is a file 332 in front layer 130 and no entry in back layer 140. Modify operation 330 modifies a file 334 in front layer 130 when there is a file 334 in front layer 130 and a file 336 in back layer 140. Modify operation 330 modifies a file 338 when there no file in front layer 130 but there is a file 338 in back layer 140, with the file 338 being kept the same in back layer 140 but saved as file 339 in front layer 130.

Figure 4A:
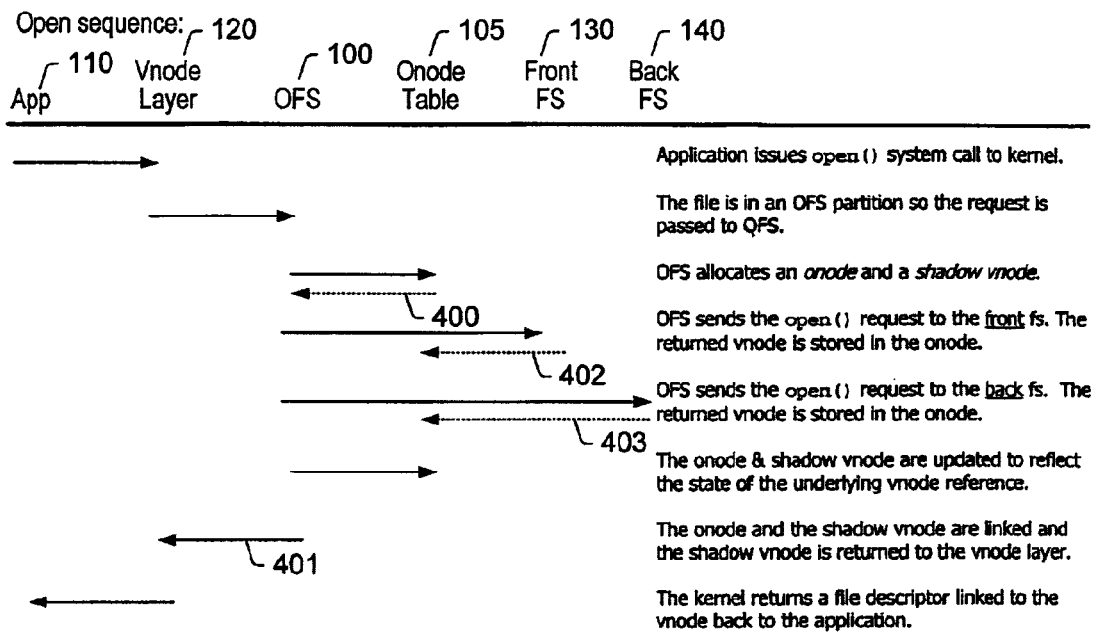
FIGS. 4A and 4B show an open sequence and read sequence, respectively, in an OFS.

FIG. 4A depicts the events occurring during an open( ) sequence, in accordance with an exemplary implementation of OFS 100. Application 110 issues an open( ) request to vnode layer 120. The file is in an OFS partition so the request is passed to OFS 100. OFS 100 allocates an onode 400 which includes a shadow vnode 401. OFS 100 sends the open( ) request to front filesystem 130, which returns a front vnode 402 which is stored in onode 400. OFS 100 also sends the open( ) request to back filesystem 140, which returns a back vnode 403 that is also stored in onode 400. Onode 400 is stored in onode table 105. Onode 400 and shadow vnode 401 are updated to reflect the state of the underlying vnode reference. Onode 400 and the shadow vnode 401 are linked and shadow vnode 401 is returned to vnode layer 120. Vnode layer 120 returns a file descriptor linked to shadow vnode 401 back to application 110.

Figure 4B:
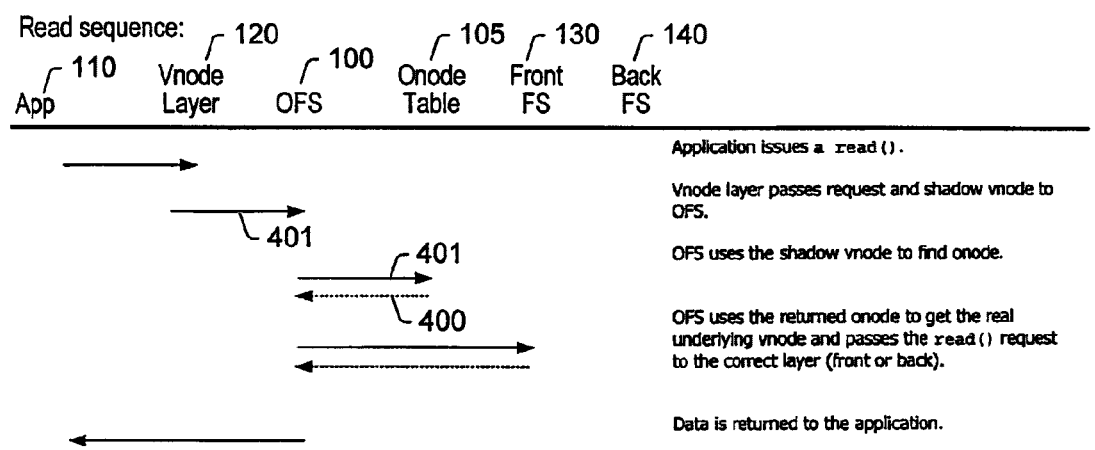

FIG. 4B depicts the events occurring during a read( ) sequence, in accordance with an exemplary implementation of OFS 100. Application 110 issues a read( ) request. Vnode layer 120 passes the read( ) request and shadow vnode 401 to OFS 100. OFS 100 uses shadow vnode 401 to find onode 400 in onode table 105. OFS 100 uses onode 400 returned by onode table 105 to get the real underlying vnode, in this example front vnode 402, and passes the read( ) request to the correct layer, in this example front filesystem 130. Data is returned to application 110.

The Solaris® kernel manages opened files via the use of vnode structures. This is the equivalent of a kernel file-handle. The vnode structure is filesystem-independent, therefore OFS 100 must return vnode interfaces to vnode layer 120 while maintaining OFS-specific data in its private structures (onodes 400). The shadow vnode 401 that is returned is to vnode layer 120 is not the underlying front vnode 402 or back vnode 403, but is instead a shadow of the real vnode.

Figure 5:
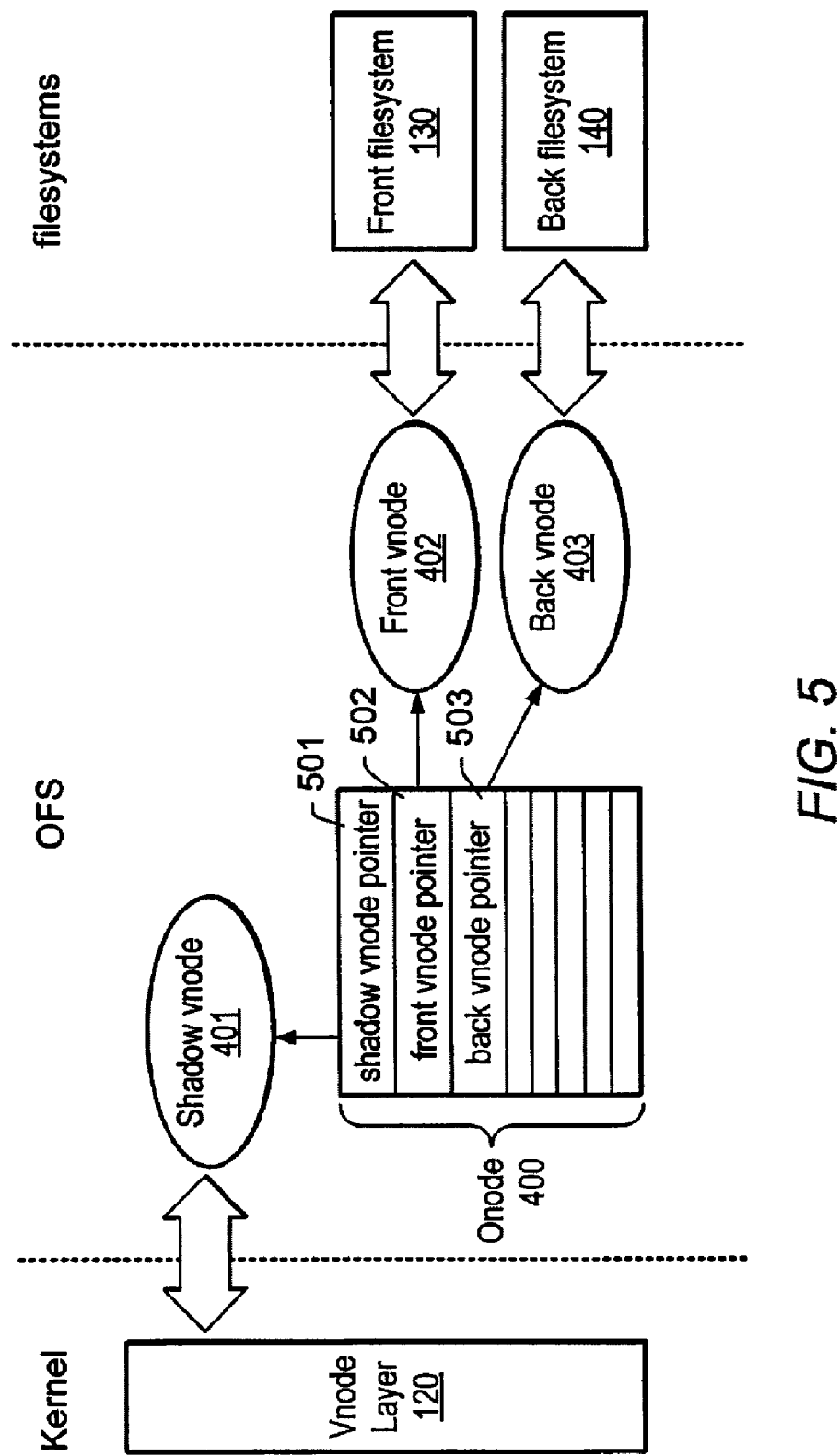
FIG. 5 shows how vnode triplets are saved in an onode and how they are passed between subsystems.

FIG. 5 shows how vnode triplets are saved in onode 400 and how they are passed between subsystems.

Onodes 400 are used to represent the state of open files in OFS 100. They are the kernel equivalent of a file-handle for OFS 100. Onodes 400 contain a triplet of vnode pointers shadow vnode pointer 501, front vnode pointer 502, and back vnode pointer 503, that are pointers to shadow vnode 401, front vnode 402, and back vnode 403 respectively. If the opened file is not present in a specific filesystem (front or back), its pointer is NULL. There is a one-to-one correspondence between onodes 400 and shadow vnodes 401 and onode/shadow vnode pairs are logically created and destroyed as one. Onodes 400 are stored in a hash table indexed by a combination of front vnode pointers 502 and back vnode pointers 503.

OFS 100 is wedged in between the vnode layer 120 and the filesystem-specific handlers, and presents shadow vnodes 401 to vnode layer 120 and passes the saved front vnode pointers 502 and back vnode pointers 503 to the corresponding filesystem handlers during I/O operations.

Every time a file (or directory) is opened in OFS 100, an onode 400 is allocated. If that file is already opened, the same corresponding onode 400 is used and the reference count for shadow vnode 401 is incremented (via VN_HOLD). Open( ) reference counts in OFS 100 are maintained using shadow vnode 401, not the underlying front vnode 402 or back vnode 403. This is due to the fact that reference counts can be manipulated directly by vnode layer 120 and if the lower-level vnode reference counts (i.e. front or back) were used, they may not be decremented correctly since they are never directly visible to vnode layer 120.

When the reference count of an onode 400 goes to zero, it is removed from onode table 105; there is no onode cache built into this design. Caching of onodes 400 can eliminate costly vnode lookups for frequently used files, however it will yield little benefit since the underlying filesystems already perform namei caching. If OFS 100 is implemented as a many-tiered filesystem (three or more layers), then caching of onodes 400 may become worthwhile.

Figure 6:
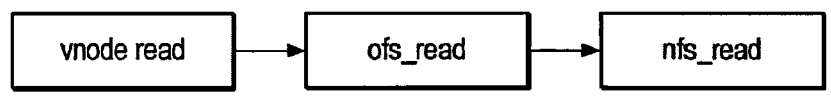
FIG. 6 shows an example of how an OFS passes through filesystem operations control to the underlying filesystem.

FIG. 6 shows an example of how OFS 100 passes through filesystem operations received from vnode layer 120 to the underlying filesystem. When OFS 100 is plugged into the kernel filesystem-switch table, a set of vnodeops (handlers for vnode operations) are installed. This set of handlers includes the standard handlers for open, close, read, write, ioctl, etc. OFS 100 will have routines for each of these entry points into OFS 100. However, since OFS 100 is a pseudo-filesystem, it has no backing-store of the filesystem structure as with unified filesystem (UFS), and the logic will be minimal, with pass-through control to the correct underlying (front or back) vnode and its corresponding filesystem control, in this example network filesystem (NFS).

The typical logic of a routine will be (example shown in pseudo-code).

```
ofs_read_handler(shadowvnode)
{
    onode retrieved from shadowvnode
    if (front_vnode exists)
        topvnode=front_vnode
    else
        topvnode=back_vnode
    func=topvnode's read_handler
    status=call func
    return (status)
}
```

Figure 7:
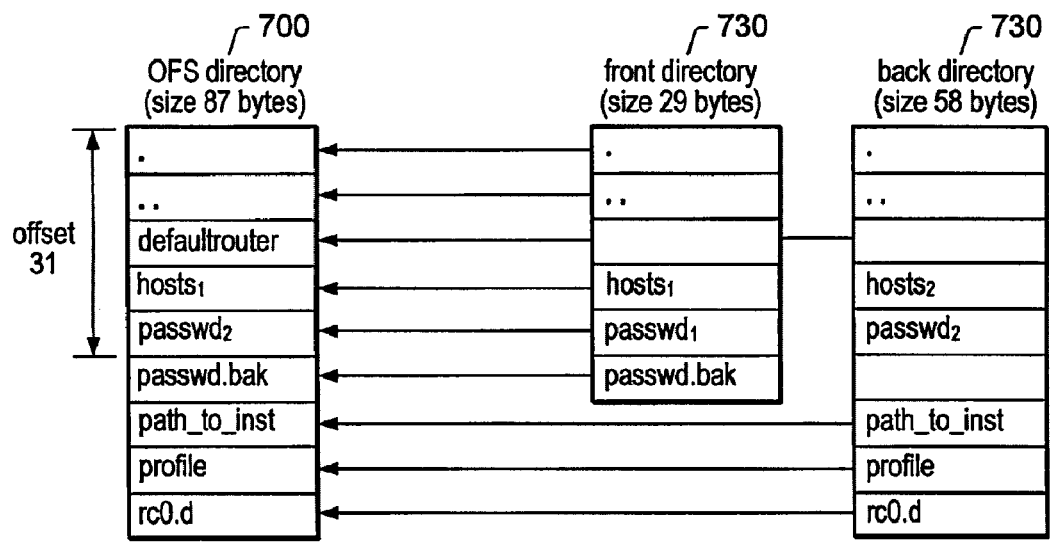
FIG. 7 shows an OFS directory formed from the union of a front directory and a back directory.

FIG. 7 shows an OFS directory 700 formed from the union of a front directory 730 and a back directory 740. Front directory 730 is associated with front filesystem 130 and back directory 740 is associated with back filesystem 140. OFS directory 700 is the union of front directory 730 and back directory 740, with front directory 730 taking precedence over back directory 740. This requires that OFS 100 create OFS directory 700, a composite directory which is strictly logical and in-memory, and it returns a virtual handle for directory operations such as getdents( ).

If a directory exists exclusively in one layer, OFS 100 will simply use that directory and no directory composition is necessary. If the same directory exists in both layers, however, then the directory contents must be merged to present a single OFS directory 700 to application 110. Duplicates must be eliminated, with front directory 730 taking precedence. The virtual size of OFS directory 700 must be presented (the total of the front and back directories). The active offset of the directory must be managed to reflect its position within the composite directory, not the real directory. Take the following example:

| Front directory = | /ejasent/site/mypoints/1.0/4/etc |
|---|---|
| Back directory = | /etc |

The current directory of a process is maintained by the kernel in the user structure (user->u_cdir). Since the real current directory may reside in the front filesystem 130 or back filesystem 140, the shadow vnode of that OFS directory 700 should be used to record the current working directory (cwd).

The root directory of a process is also maintained by the kernel in the user structure (user->u_rdir). This pointer should point to shadow vnode 401 and not the real underlying front vnode 402 or back vnode 403.

Traversing the OFS root directory is not allowed because of the possibility of recursion. With OFS 100, it is possible to mount a subdirectory on top of a parent directory. For example:

| Front filesystem = | /ejasent/site/mypoints/1.1/0/ |
|---|---|
| Back filesystem = | / |

After the OFS mount, the base of front filesystem 130 is visible via back filesystem 140. In an OFS environment, if the following was done:
 cd/
 cd ejasent/site/mypoints/1.1/0

In theory this should be legal, since "ejasent/site/mypoints/1.1/0" can be resolved in back filesystem 140. Once resolved, you are now back at the root, and can once again type:
 cd ejasent/site/mypoints/1.1/0 and so on, and so on. For this reason, traversal of the OFS root directory from a higher level directory is not permitted.

Figure 8A:
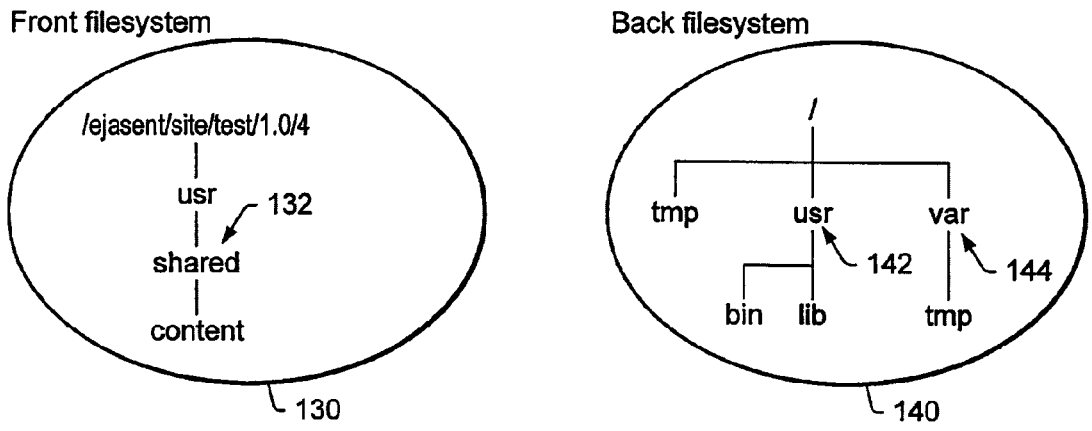
FIG. 8A shows a front filesystem and a back filesystem before an OFS mount has been performed.
Figure 8B:
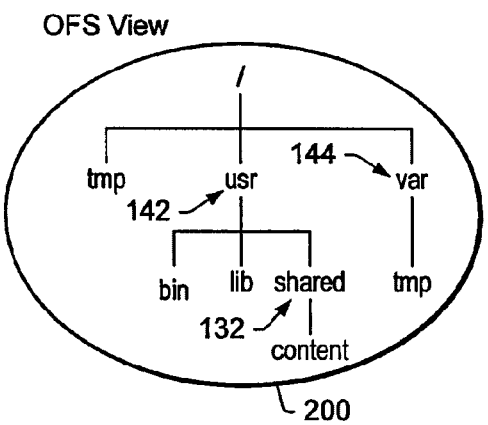
FIG. 8B shows an overlay filesystem after an OFS mount has been performed.

FIG. 8A shows front filesystem 130 with a mount point 132 and back filesystem 140 with mount points 142 and 144, before an OFS mount has been performed. FIG. 8B shows overlay filesystem 200, after an OFS mount has been performed, with mount points 132, 142 and 144 intact. An OFS mount is performed like any other filesystem mount. The mount( ) system call will support OFS mount requests, and an ofsmount command will be created that behaves similar to /usr/sbin/mount. Entries for the OFS mount will be created in /etc/mnttab, so that the mount can be cleaned up manually from a shell script in the event that an unmount was not performed during a snapshot.

The OFS mount should only affect the process that initiated the mount, or any children spawned from the process that performed the mount. Unrelated processes should not see the overlay effect of OFS 100.

Mounts of other filesystems in front filesystem 130 and in back filesystem 140 are respected. Since front filesystem 130 and back filesystem 140 are really just directory hierachies, mounts within those directories stay in effect.

On the other hand, additional filesystem mounts that are performed in an OFS directory after the OFS mount will have quite a different effect. The mount will nullify the effect of OFS 100 for the covered portion of the OFS hierarchy. This is the standard semantic for mounted filesystems under UNIX; only the topmost filesystem is visible after a mount.

OFS 100 provides copy-on-write behavior to allow sharing of back filesystem 140, which is read-only. This enables applications to begin with a back filesystem 140 that is shared, while making modifications to a front filesystem 130 that is private. Upon modification, files are faulted to front filesystem 130, and the shared read-only versions are now hidden by the modified versions on top.

Although OFS provides copy-on-write functionality, it is not a true copy-on-write filesystem. To maximize the sharing benefit under OFS 100, the copy-on-write mechanism may be enhanced. The differences between OFS 100 and traditional copy-on-write are: (1) granularity is not at the block or page level, but at the file level. During a copy-on-write fault, the entire file is replicated, and (2) the fault occurs during an open-for-write, not at the time a write is attempted (this scheme simplifies address-space mapping issues during the fault).

Figure 9A:
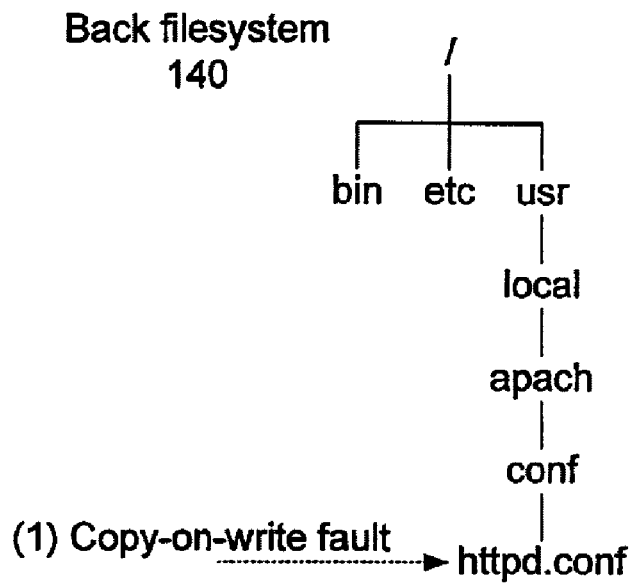
FIGS. 9A and 9B show an example of how an OFS performs autopopulation of a directory for a front filesystem.
Figure 9B:
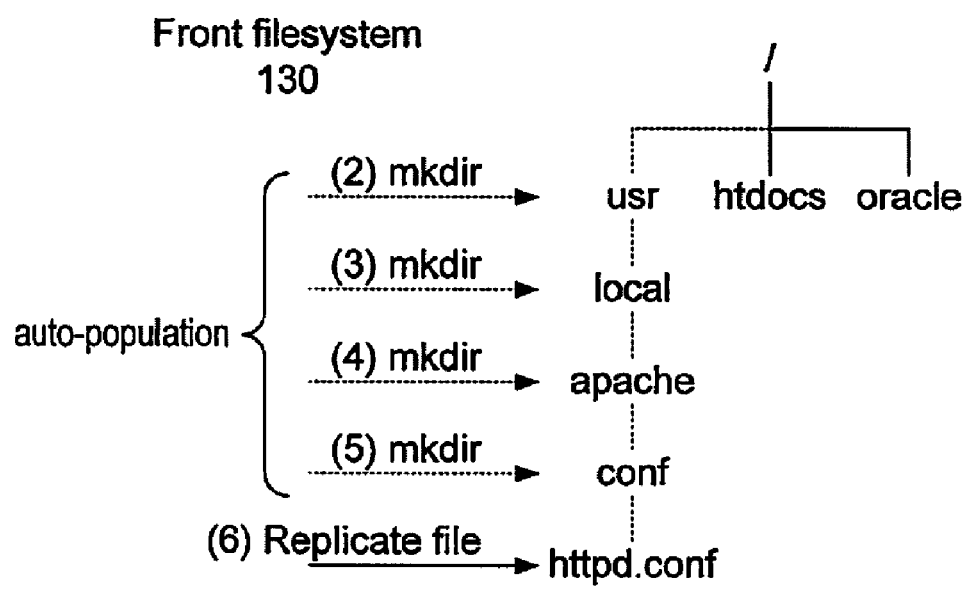

FIGS. 9A and 9B show an example of how OFS 100 performs autopopulation of a directory for front filesystem 130. Directory hierarchies on front filesystem 130 and back filesystem 140 are not necessarily the same; therefore, at the time of a copy-on-write fault, the directory containing the file may also need to be brought to front filesystem 140. This process is called autopopulation. During a fault, if the directory of the file is not present in front filesystem 140, the directory path will be replicated to the front with the same permissions as back filesystem 130.

Symbolic links under OFS are supported, and the target of the link is evaluated using OFS semantics. For example, a symbolic link may reside in back filesystem 140 that points to a file that resides in front filesystem 130. Similarly, a symbolic link that exists in front filesystem 130 can point to a file in back filesystem 140. As a result, during the evaluation of a pathname, specific directory components may traverse back and forth between front filesystem 130 and back filesystem 140.

Device drivers, named pipes, and other special files are supported under OFS 100, however no copy-on-write behavior occurs during writes. Special files may be present in either front filesystem 130 or back filesystem 140.

OFS 100 includes features for running applications under OFS 100. OFS 100 may be integrated with snapshot/restore. A run command must be modified to perform an OFS mount prior to starting the application. A snapshot command needs to save the OFS mount information as part of the snapshot and unmount any OFS-mounted directories. A restore command needs to retrieve the OFS mount information from the snapshot file and remount the directories during the restore process. If the back filesystem is "/", the root directory, a chroot( ) system-call must be issued (using the base of the front directory) after the mount is performed during a run or restore.

Once the mount and chroot have been issued, the restore process will see the same view as the application interface (AI), therefore the sequence of opening snapshots, restoring file descriptors, and activating OFS must be ordered properly to construct the correct pathnames to files (may be different depending whether it is pre-mount or post-mount).

Figure 10:
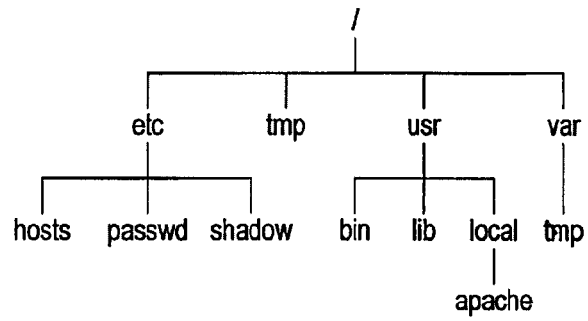
FIG. 10 shows a hierarchy formed from mounting a compute node directory onto an application interface directory in an OFS.

FIG. 10 shows a hierarchy formed from mounting a compute node directory onto an application interface directory in OFS 100. An AI can start with a empty $AIROOT directory that serves as the front filesystem. Any files that are placed under the $AIROOT directory will override the same file under back filesystem 140.

For example, if we take the following directories:

| | |
|---|---|
| Back filesystem = | / |
| Front filesystem = | /ejasent/site/mypoints/1.1/0/ | and create an AI-specific version of the hosts file and place it here:

/ejasent/site/mypoints/1.1/0/etc/hosts

Then if we OFS mount /ejasent/site/mypoints/1.1/0/on top of /, any attempt by the application to open /etc/hosts will use the hosts file under the $AIROOT directory.

To prepare an $AIROOT directory, any AI-specific system files should be pre-installed by taking their absolute pathname and prepending $AIROOT to it. Then the AI's files should be installed under $AIROOT.

For example, if we install the following files and directories:

/ejasent/site/mypoints/1.1/0/etc/hosts
/ejasent/site/mypoints/1.1/0/etc/passwd
/ejasent/site/mypoints/1.1/0/etc/shadow
/ejasent/site/mypoints/1.1/0/usr/local/apache/

And the compute node's root disk contains the following directories (just a subset shown for example):

/
/usr/
/usr/bin/
/usr/lib/
/etc/
/tmp/
/var/tmp/ then after the OFS mount and chroot, the hierarchy shown in FIG. 10 would be presented to the application.

Under OFS 100, it is not possible to traverse down through the OFS root directory or up through the OFS root directory. Therefore, AI's need to be configured so that all pathname references are relative or are absolute from the OFS root.

For example, if the true paths to a file that exists in front filesystem 130 (prior to the OFS mount) is the following:

/ejasent/site/mypoints/1.0/2/ai_bin/0apache_start and after the OFS mount, the file appears under OFS as:

/ai_bin/0apache_start

Then the former is not a valid pathname under OFS 100 since it traverses the OFS root directory. What this implies is that references to the variable $AIROOT are not supported if the pathname evaluation occurs while running in the OFS environment.

Similarly, if the base of the front filesystem is:

/ejasent/site/mypoints/1.0/2/ and the following directory is referenced:

/ejasent/site/mypoints/1.0/shared the directory cannot be referenced under OFS by doing the following:

cd/
ls ../shared since this requires traversing up past the OFS root directory.

Once the OFS mount is set up, files created by the application under /tmp will be preserved automatically under $AIROOT/tmp. The same applies to /var/tmp. By retargeting all file-access to route through the front filesystem first, we have created a mechanism that removes the need to modify system files with AI-specific information on compute nodes (or to install dynamic links), isolates one AI's files from another (removes conflicts), prevents the AI from modifying system files (security), and does not require application config files to be modified (references to /usr/local can remain /usr/local).

Mount information in the kernel is stored globally (not a per-process view), therefore it is not possible for two AI's, on the same machine at the same time, to mount different $AIROOT directories onto /. For example:

| AI #1 | |
|---|---|
| Front filesystem | /ejasent/site/mypoints/1.0/2/ |
| Back filesystem | / |
| AI #2 | |
| Front filesystem | /ejasent/site/ads-r-us/1.3/1 |
| Back filesystem | / |

With standard filesystem semantics, if both directories were mounted onto /, the most recent mount would cover the earlier mount and render it non-functional. Therefore as part of the implementation, we internally reverse the order of the mount arguments such that/is really mounted on /ejasent/site/mypoints/1.0/2, but logically /ejasent/site/mypoints/1.0/2 is really the topmost directory. In this manner, we can isolate the mounts so that they do not interfere with each other.

Figure 11:
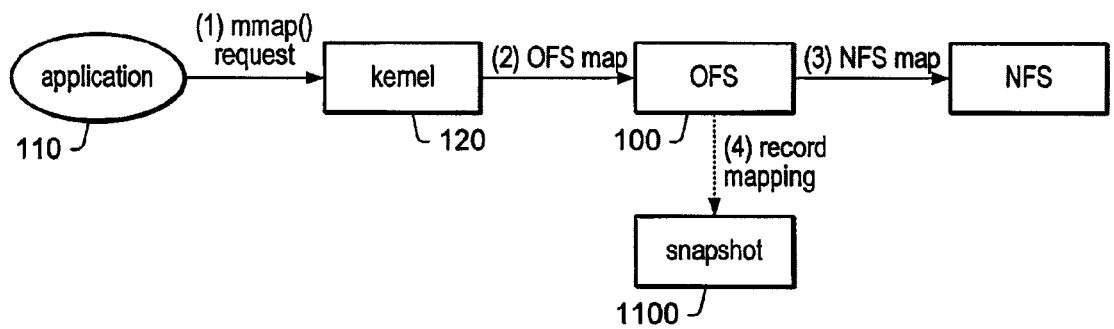
FIG. 11 shows an OFS and a snapshot callback hook.

FIG. 11 shows OFS 100 and a snapshot callback hook. OFS 100 provides support for a snapshot/restore module 1100 by allowing callbacks during filesystem operations into snapshot/restore module 1100. Although OFS 100 is primarily independent of the snapshot technology, the design of intercepting file requests for I/O and mapping make it the perfect candidate for installing snapshot hooks.

Figure 12:
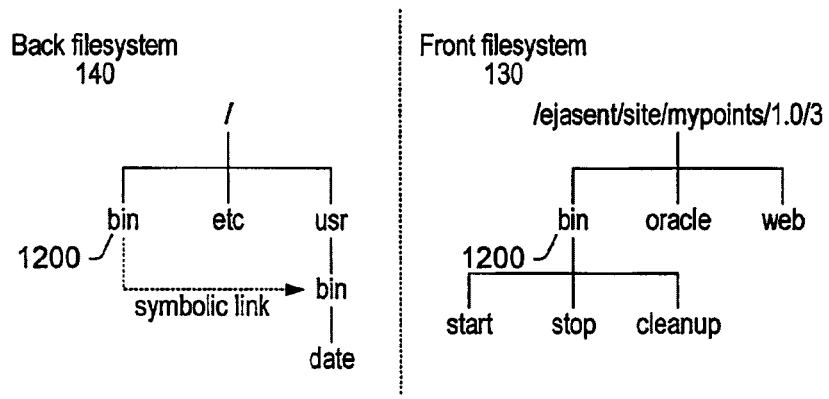
FIG. 12 shows a broken symbolic link.

FIG. 12 shows a broken symbolic link. The overlay filesystem is a stateless filesystem, and front filesystem 130 does not maintain state information about back filesystem 140. This condition allows OFS 100 to operate on simple directories without a proprietary filesystem structure. However, because of this condition, OFS 100 does not enforce or check for inconsistencies between front filesystem 130 and back filesystem 140. For example, front filesystem 130 and back filesystem 140 both have a "bin" entry 1200 at their respective roots, but in back filesystem 140, "bin" entry 1200 is a symbolic link, and in front filesystem 130, "bin" entry 1200 is a directory.

In this example, the front entry will cover the back entry and will in effect disable the symbolic link in the back. References to /bin/date will not work correctly because of this inconsistency. This issue only occurs if front filesystem 130 is pre-populated with conflicting entries.

Figure 13A:
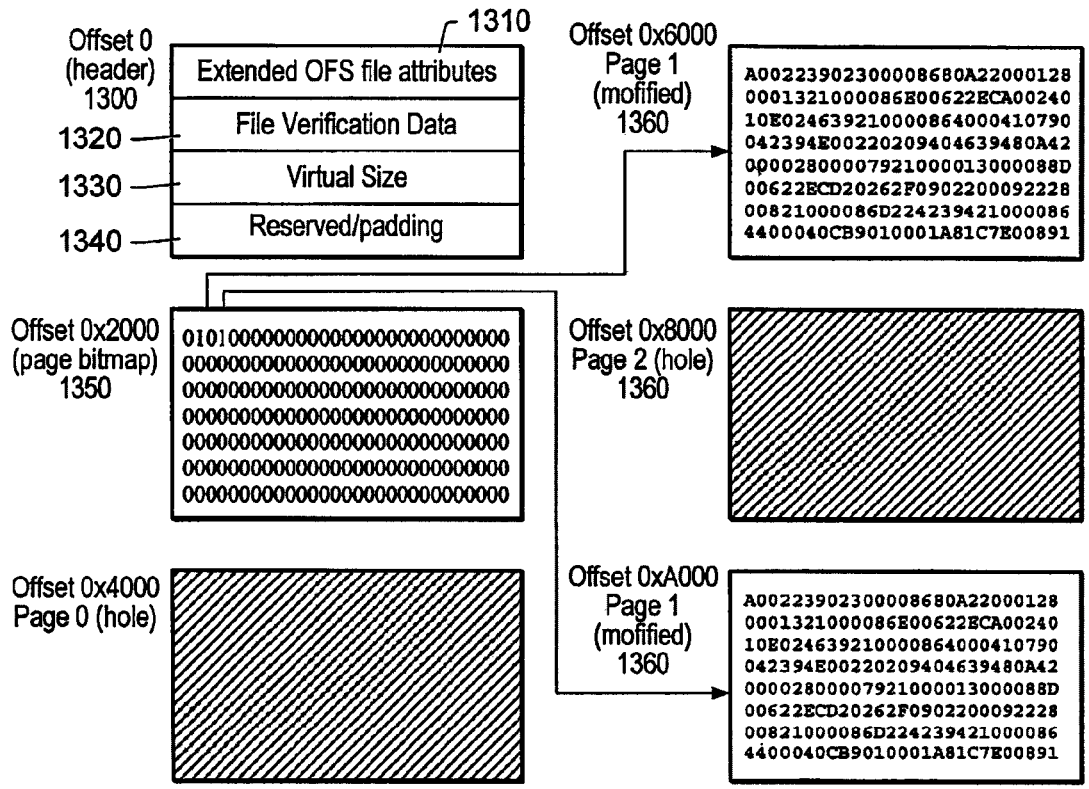
FIG. 13A shows an example of page-level copy-on-write file structure stored in a front filesystem.

FIG. 13A shows an example of page-level copy-on-write file structure stored in front filesystem 130. This structure can be instrumented by satisfying read requests for unmodified pages from a file on back filesystem 140, and requests for modified pages are supplied from a file in front filesystem 130. To avoid the implementation of a filesystem structure, the meta-level data that describes the composition of the front and back pages could be stored in the front file itself. This would however imply that the front file is no longer accessible without OFS and this page-level copy-on-write structure is no longer a stateless overlay.

Implementation of a page-level copy-on-write allows large files with sparse modifications, such as databases, to be utilized under OFS 100.

The front file is a proprietary structured format consisting of a header 1300, page maps 1350 and actual pages 1360. The file itself is a sparse file and is only populated with copy-on-write pages, but virtually adjacent pages are stored contiguously to allow for simplified mapping and to enable page clustering algorithms in the kernel. The pagemaps repeat at fixed offsets and are simple bitmaps indicating the presence of a copied-on-write page in the front file.

Header 1300 stores extended file attributes 1310, file verification data 1320, virtual size 1330, and reserved/padding 1340. Extended file attributes 1310 are any flags specific to OFS (since the other filesystem attribute structures are not extensible) such as a hidden attribute. File verification data 1320 is used to provide consistency checks. File verification data 1320 provides a means of validating when updates occur to the back-filesystem (outside of OFS control) after a copy-on-write has occurred. File verification data 1320 may be a copy of the original file attributes (permissions, modification times, size). Since the true file size is only known after evaluating the combination of both the front and back files, a virtual size 1330 is saved as part of header 1300 and header 1300 is updated whenever the file is updated, rather than the evaluation being done at run-time. The front file may contain pages that extend beyond the size of the original file or the application may have truncated the file. Reserved/padding 1340 is reserved for future use and padded to a page alignment.

Figure 13B:
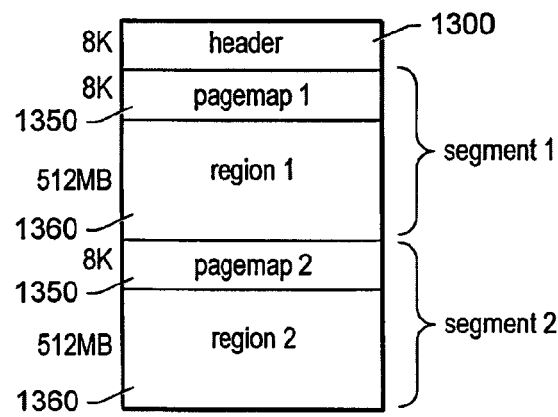
FIG. 13B shows segments within an OFS copy-on-write file.

FIG. 13B shows segments within an OFS copy-on-write file. After header 1300 is a pagemap 1350. Each pagemap 1350 is paired with a region 1360 which represents a single copy-on-write segment. A single pagemap (8K in size) can map a 512 MB file region, and pagemaps 1350 repeat prior to starting the next region.

To find the offset of the correct pagemap 1350 for any given filesystem, page can be calculated as:

pageindex=((file offset & ~(pagesize−1))>>pageshift)/(sizeof(word)*pagesize)

pagemap offset=(pageindex*pagesize)+sizeof(header)

Once the correct pagemap 1350 is located, identification of the specific bit that corresponds to the page in that region covered by the bitmap is a matter of converting the page offset (into that region) into the bit offset (into the bitmap):

bitindex=((file offset & ~(pagesize−1))>>pageshift)%((pageindex*pagesize)−1)

If the corresponding bit at this index (bitindex) in the pagemap is set, the page is present in the copy-on-write file, the file offset for the page should be calculated:

file offset=pagemap offset+((bitindex+1)*pagesize)

and the VOP_GETPAGE( ) and VOP_READ( ) routines in the kernel should fill page requests from this offset in the front file.

Pagemaps 1350 can be cached in the kernel (hanging off onode 400), and any copy-on-write fault should be processed atomically with the pagemap update.

In a file-attribute copy-on-write system, if the attributes of a file (permissions, ownership, etc) are modified on a file that exists only in back filesystem 140, a mechanism allows new attributes to be overlaid onto front filesystem 130. If the attributes are copied-on-write to front filesystem 130 with an empty file, the attributes may be tagged so that only the attributes and not the entire file contents need to be replicated in front filesystem 130, thus saving space.

Figure 14:
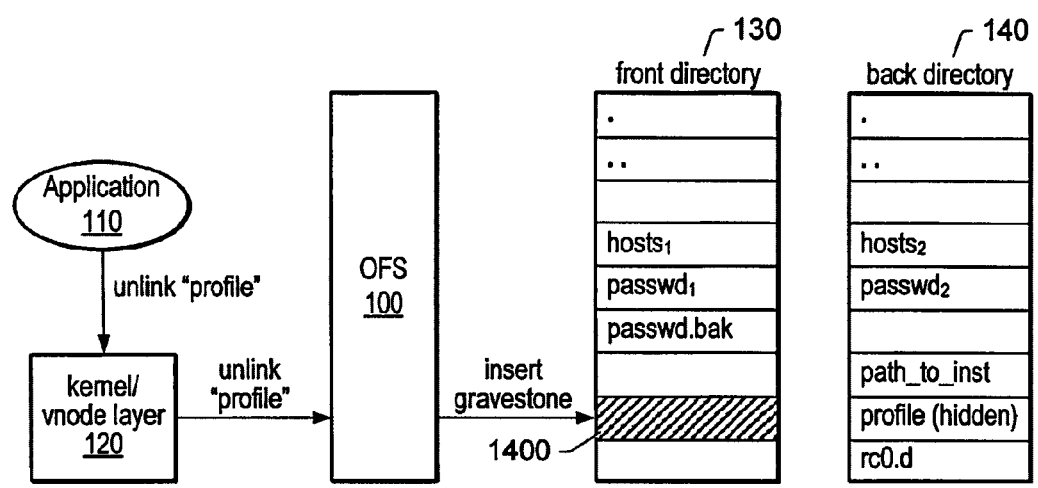
FIG. 14 shows an OFS inserting gravestones to hide files during an unlink to a back filesystem.

FIG. 14 shows OFS 100 inserting a gravestone 1400 to hide files during an unlink to back filesystem 140. In transparent mode, files in back filesystem 140 can be apparently removed (given the proper permissions). "Apparently" denotes that the file is not really removed from back filesystem 140 but is removed from the application's viewpoint. This process can be implemented by implementing gravestones in front filesystem 130 to mark the departure of a file in back filesystem 140. This will in effect, hide the back-file from the OFS user. Other system calls would also require this functionality to remove entries in back filesystem 140, i.e. rename( ), rmdir( ).

Creating a hard link to a file in back filesystem 140 cannot be implemented without first faulting the file, or some representation of it, to front filesystem 130. This requirement is attributable to the fact that the true underlying partition of the front filesystem 130 and back filesystem 140 may not be the same, and hard links are not supported across filesystems in UNIX. One way to accomplish the correct semantics for a hard link is by a file-attribute copy-on-write (without any changes), and then hard-linking to the empty file (placeholder) in the front. Changing the link count from 1 to 2 is in effect, an attribute change.

Presenting shared mappings to processes after a copy-on-write fault is problematic if the mappings are now coming from two separate files. If the read-only reference to a shared page refers to an object in the back filesystem, but the modified reference to that shared page comes from front filesystem 130 (after the fault), there is an inconsistency. The problem lies in that copy-on-write behavior is desirable at the file level, but copy-on-write behavior is not desired in memory because memory has to be consistent. OFS 100 will either need to revoke the existing (out-of-sync) mappings, or keep the modified page in the kernel filesystem page cache and make sure that the page is flushed to front filesystem 130. Until the page is flushed, and the OFS meta-structure is updated, new references to the page have to be satisfied from the page cache by changing the lookup to refer to the front file.

Once the page is flushed and the meta-structure is atomically updated, new references will automatically pick up the page from the correct file.

In one embodiment, the inode of the topmost version of the file is presented, but after a copy-on-write fault has occurred, a file's apparent inode number will have changed. This behavior can be visible to the application if it explicitly uses the inode number (not likely, but possible). Therefore, once copy-on-write is implemented at the page-level, the inode number of the back-file should always be used for consistency.

Locking files under OFS 100 is acceptable, except in the case of copy-on-write. When there is a copy-on-write fault, synchronization must be maintained using a single file to prevent inconsistency. This process works for file-level locks, but if segment locks are being used and the kernel is checking for valid ranges (within the file), the segment locks will have to be selectively applied to either front or back files (or split between both) depending on whether the region contains pages that have been copied-on-write. If no range checking is performed (i.e. the backfire can contain segment locks on pages that aren't present), then all file locking can be done on the backfile.

OFS 100 may also be implemented through versioning of files through layering, wherein each subsequent version of a file is stored to a newly created topmost layer. In one embodiment, OFS 100 is two-tiered, but most of the logic can be extended to multiple layers with little or no effort.

OFS 100 is capable of providing file access to processes as well as users. OFS 100 allows layers to be arranged in any desired order, not only in a time-of-creation order. For example, in a shared application directory, back filesystem 140 may be shared and contain platform-independent text files, but front filesystem 130 may contain platform-dependent binary files, such as binary files for Linux and Solaris® operating systems. In another example, depending on which front layer is mounted, the view presented may be a "platform" view or a "localized language" view, not necessarily a "most recent" view.

While the invention has been described in terms of some specific examples and in some specific embodiments, it will be clear that this invention is not limited to these specific examples and embodiments and that many changes and modified embodiments will be obvious to those skilled in the art without departing from the true spirit and scope of the invention as defined in the appended claims.

What is claimed is:

1. A system comprising:
   at least one processor; and
   at least one memory coupled to the at least one processor, wherein the at least one memory is configured to store:
      a vnode layer configured to receive a plurality of requests for filesystem operations generated by at least one application, wherein the plurality of requests for the filesystem operations comprise an open( ) request specifying a file; and
      an overlay filesystem comprising:
         a back filesystem containing shared read-only files; and
         a front filesystem mounted above the back filesystem and containing writable files;
      wherein the overlay filesystem is configured to:
         selectively route the plurality of requests for the filesystem operations from the vnode layer to the front and back filesystems; and
         allocate an onode in the at least one memory upon opening the file specified by the open( ) request, wherein the onode corresponds to the file specified by the open( ) request and comprises a shadow vnode.

2. The system of claim 1, wherein the overlay filesystem is configured to:
   send the open( ) request to the front filesystem which returns a front vnode to be stored in the onode, and
   send the open( ) request to the back filesystem which returns a back vnode to be stored in the onode.

3. The system of claim 2,
   wherein the shadow vnode maintains a reference count that is incremented each time the file is opened.

4. The system of claim 2,
   wherein the onode and the shadow vnode are linked and the shadow vnode is returned to the vnode layer.

5. The system of claim 4,
   wherein the vnode layer returns to the application a file descriptor linked to the shadow vnode.

6. The system of claim 1,
   wherein the plurality of requests for the filesystem operations comprise a read( ) request specifying a second file;
   wherein the overlay filesystem is configured to
      receive the read( ) request and a second shadow vnode from the vnode layer;
      determine a vnode for a filesystem from an onode for the second file; and
      pass the read( ) request to the filesystem.

7. The system of claim 6,
   wherein the vnode for the filesystem is a front vnode for the front filesystem.

8. The system of claim 1,
   wherein a structure of the vnode layer is filesystem-independent; and
   wherein the overlay filesystem maintains a plurality of onodes.

9. The system of claim 8,
   wherein each onode comprises a vnode triplet.

10. The system of claim 9,
    wherein the vnode triplet includes a shadow vnode pointer, a front vnode pointer, and a back vnode pointer that point to a shadow vnode, a front vnode, and a back vnode, respectively.

11. The system of claim 8, wherein each onode is stored in a hash table.

12. The application processing network system of claim 1,
    wherein the overlay filesystem includes more than two filesystems and is further configured to allocate and cache a plurality of onodes.

13. The system of claim 1,
    wherein the overlay filesystem is further configured to support a snapshot/restore module.

14. The system of claim 1,
    wherein the overlay filesystem is further configured to implement a file in the front filesystem with a page-level copy-on-write structure.

15. The system of claim 14,
    wherein a format of the file in the front filesystem includes a header, a page map, and a page.

16. The system of claim 15,
    wherein the header stores extended file attributes, file verification data, virtual size, and reserved/padding.

17. The system of claim 15,
    wherein the page map comprises a bitmap indicating a location of the page in the front filesystem.

18. A computer-implemented method comprising:
    receiving a plurality of requests for filesystem operations at a vnode layer, wherein the plurality of requests for filesystem operations are generated by at least one application, and wherein the plurality of requests for the filesystem operations comprise an open( ) request specifying a file;
    selectively routing the plurality of requests for the filesystem operations from the vnode layer to a back filesystem and a front filesystem in an overlay filesystem, wherein the back filesystem contains shared read-only files, and wherein the front filesystem is mounted above the back filesystem and contains writable files; and
    allocating an onode in memory upon opening the file specified by the open( ) request, wherein the onode corresponds to the file specified by the open( ) request and comprises a shadow vnode.

19. A computer-readable storage medium comprising program instructions, wherein the program instructions are computer-executable to perform:

receiving a plurality of requests for filesystem operations at a vnode layer, wherein the plurality of requests for filesystem operations are generated by at least one application, and wherein the plurality of requests for the filesystem operations comprise an open( ) request specifying a file;

selectively routing the plurality of requests for the filesystem operations from the vnode layer to a back filesystem and a front filesystem in an overlay filesystem, wherein the back filesystem contains shared read-only files, and wherein the front filesystem is mounted above the back filesystem and contains writable files; and allocating an onode in memory upon opening the file specified by the open( ) request, wherein the onode corresponds to the file specified by the open( ) request and comprises a shadow vnode.

* * * * *

UNITED STATES PATENT AND TRADEMARK OFFICE
CERTIFICATE OF CORRECTION

PATENT NO. : 7,197,516 B1 Page 1 of 1
APPLICATION NO. : 10/625219
DATED : March 27, 2007
INVENTOR(S) : Hipp et al.

It is certified that error appears in the above-identified patent and that said Letters Patent is hereby corrected as shown below:

In the Claims:

Claim 12, col. 14, line 21, please delete "application processing network".

Signed and Sealed this

Twenty-sixth Day of June, 2007

JON W. DUDAS
*Director of the United States Patent and Trademark Office*